(12) United States Patent
Niihara et al.

(10) Patent No.: US 11,454,514 B2
(45) Date of Patent: Sep. 27, 2022

(54) DISTANCE ESTIMATION DEVICE, DISTANCE ESTIMATION METHOD AND PROGRAM

(71) Applicant: PIONEER CORPORATION, Tokyo (JP)

(72) Inventors: Ryoko Niihara, Kanagawa (JP); Masahiro Kato, Kanagawa (JP); Hitoshi Kaneko, Saitama (JP)

(73) Assignee: PIONEER CORPORATION, Tokyo (JP)

( * ) Notice: Subject to any disclaimer, the term of this patent is extended or adjusted under 35 U.S.C. 154(b) by 183 days.

(21) Appl. No.: 16/066,006

(22) PCT Filed: Dec. 25, 2015

(86) PCT No.: PCT/JP2015/086333
§ 371 (c)(1),
(2) Date: Jun. 25, 2018

(87) PCT Pub. No.: WO2017/109973
PCT Pub. Date: Jun. 29, 2017

(65) Prior Publication Data
US 2019/0011282 A1 Jan. 10, 2019

(51) Int. Cl.
*G01C 22/00* (2006.01)
*G01C 22/02* (2006.01)
(Continued)

(52) U.S. Cl.
CPC .............. *G01C 22/02* (2013.01); *G01C 3/22* (2013.01); *G01C 21/20* (2013.01); *G01C 22/00* (2013.01);
(Continued)

(58) Field of Classification Search
CPC .......... G01C 22/02; G01C 22/00; G01C 3/22; G01C 21/20; G01S 17/86; G01S 17/42;
(Continued)

(56) References Cited

U.S. PATENT DOCUMENTS

| 5,986,601 A | * | 11/1999 | Sugimoto | ............... G01S 7/415 |
| | | | | 342/70 |
| 2005/0134440 A1 | * | 6/2005 | Breed | ...................... G01S 17/89 |
| | | | | 340/435 |

(Continued)

FOREIGN PATENT DOCUMENTS

| JP | 2004309502 A | * | 11/2004 |
| JP | 2008-008783 A | | 1/2008 |

(Continued)

OTHER PUBLICATIONS

Jurisica et al., "Triangulation of mobile robot position with detected inherent environment landmarks" IN "International Journal of Mechanics and control", Nov. 2, 2009, pp. 15-25.*

(Continued)

*Primary Examiner* — Eyob Hagos
(74) *Attorney, Agent, or Firm* — Procopio, Cory, Hargreaves & Savitch LLP

(57) ABSTRACT

The distance estimation device acquires distances from a movable body at a first time and a second time to two ground objects, respectively, and acquires a distance between the two ground objects. Then, the distance estimation device calculates a moving distance of the movable body from the first time to the second time based on the acquired results. Thus, the distance estimation device calculates the moving distance of the movable body by using arbitrary ground objects measurable from the movable body.

14 Claims, 13 Drawing Sheets

(51) Int. Cl.
G01C 3/22 (2006.01)
G01S 17/42 (2006.01)
G01S 7/48 (2006.01)
G01S 17/58 (2006.01)
G01S 5/16 (2006.01)
G01S 17/86 (2020.01)
G01C 21/20 (2006.01)
G01P 3/00 (2006.01)
G08G 1/052 (2006.01)

(52) U.S. Cl.
CPC .............. G01S 5/16 (2013.01); G01S 7/4808 (2013.01); G01S 17/42 (2013.01); G01S 17/58 (2013.01); G01S 17/86 (2020.01); *G01P 3/00* (2013.01); *G08G 1/052* (2013.01)

(58) Field of Classification Search
CPC .......... G01S 7/4808; G01S 17/58; G01S 5/16; G01P 3/00; G08G 1/052
See application file for complete search history.

(56) References Cited

U.S. PATENT DOCUMENTS

| | | |
|---|---|---|
| 2014/0046587 A1 | 2/2014 | Rintanen |
| 2015/0224986 A1* | 8/2015 | Heinrichs-Bartscher ................... B60W 40/12 701/70 |
| 2015/0237790 A1 | 8/2015 | Redden et al. |
| 2016/0101779 A1* | 4/2016 | Katoh ............... B60W 30/0953 340/435 |
| 2016/0313451 A1 | 10/2016 | Rintanen |
| 2017/0290260 A1 | 10/2017 | Redden et al. |
| 2019/0090408 A1 | 3/2019 | Redden et al. |

FOREIGN PATENT DOCUMENTS

| | | |
|---|---|---|
| JP | 2008-082925 A | 4/2008 |
| JP | 2008-215991 A | 9/2008 |

OTHER PUBLICATIONS

Ladislav Jurisica et al., "Triangulation of Mobile Robot Position with Detected Inherent Environment Landmarks", "International Journal of Mechanics and Control", vol. 1 Dec. 2009, Levrotto & Bella, Torino, Italy, XP055598060, ISSN: 1590-8844 vol. 10, pp. 15-25, 60 pages in total.

Extended European Search Report for related European Application No. 15911407.3 dated Jul. 9, 2019; 9 page.

International Search Report for related International Application No. PCT/JP2015/086333, dated Mar. 29, 2016; English translation provided; 2 pages.

European Patent Office, Extended European Search Report, Application No. 21201464.1, dated Nov. 24, 2021, in 6 pages.

* cited by examiner $X, Y, Z$ : VEHICLE COORDINATE SYSTEM
$O$ : ORIGIN OF VEHICLE COORDINATE SYSTEM
$P$ : GROUND OBJECT POSITION IN VEHICLE COORDINATE SYSTEM
$P'$ : ORTHOGRAPHIC PROJECTION FROM POINT P TO XY PLANE

FIG. 12A (NUMBER OF PULSES PER ONE SECOND)

| NUMBER OF PULSES PER REVOLUTION | 100km/h | 80km/h | 60km/h | 50km/h | 40km/h | 30km/h | 10km/h |
|---|---|---|---|---|---|---|---|
| 2 PULSES | 35 PULSES | 28 PULSES | 21 PULSES | 17 PULSES | 14 PULSES | 7 PULSES | 3 PULSES |
| 4 PULSES | 70 PULSES | 56 PULSES | 42 PULSES | 35 PULSES | 28 PULSES | 14 PULSES | 6 PULSES |

FIG. 12B (RELATION BETWEEN TRAVELING SPEED AND PULSE WIDTH)

| NUMBER OF PULSES PER REVOLUTION | 100km/h | 80km/h | 60km/h | 50km/h | 40km/h | 30km/h | 10km/h |
|---|---|---|---|---|---|---|---|
| 2 PULSES | 28.3 ms | 35.3 ms | 47.1 ms | 56.5 ms | 70.7 ms | 94.2 ms | 282.6 ms |
| 4 PULSES | 14.1 ms | 17.7 ms | 23.5 ms | 28.3 ms | 35.3 ms | 47.1 ms | 141.3 ms |

DISTANCE ESTIMATION DEVICE, DISTANCE ESTIMATION METHOD AND PROGRAM

CROSS-REFERENCE TO RELATED APPLICATIONS

This application is a U.S. National Stage entry of PCT Application No: PCT/JP2015/086333, filed Dec. 25, 2015, the contents of which are incorporated herein by reference.

TECHNICAL FIELD

The present invention relates to a technique of estimating a moving distance of a movable body.

BACKGROUND TECHNIQUE

Patent Reference-1 discloses a technique of correcting a vehicle speed sensor installed in a movable body by estimating a moving distance of the movable body in a predetermined time period, for example. In Patent Reference-1, the correction device detects a number of output pulses of the vehicle speed sensor after the image recognition means recognizes a ground object A until the image recognition means recognizes a ground object B, and acquires a distance D between the ground object A and the ground object B from map information. Then, the correction device corrects an arithmetic expression for calculating a traveling distance or a traveling speed of a vehicle from the number of output pulses, based on the relation between the number of output pulses and the distance D.

PRIOR ART REFERENCES

Patent References

Patent Reference-1: Japanese Patent Application Laid-Open under No. 2008-8783

SUMMARY OF THE INVENTION

Problem to be Solved by the Invention

However, according to the method of Patent Reference-1, since the image recognition means can recognize only one ground object at one time, the correction device can use only a ground object existing on a road on which the vehicle is traveling, such as a road sign painted on a road.

The above is an example of the problem to be solved by the present invention. It is an object of the present invention to estimate a traveling distance of a movable body by utilizing arbitrary ground objects.

Means for Solving the Problem

An invention described in claims is a distance estimation device comprising: a first acquiring unit configured to acquire distances from a movable body at a first time and a second time to two ground objects, respectively; a second acquiring unit configured to acquire a distance between the two ground objects; and a calculating unit configured to calculate a moving distance of the movable body from the first time to the second time based on results acquired by the first acquiring unit and the second acquiring unit.

Another invention described in claims is a distance estimation device comprising: a first acquiring unit configured to acquire distances from a movable body at a first time and a second time to at least three ground objects, respectively; a second acquiring unit configured to acquire distances between the at least three ground objects, respectively; and a calculating unit configured to calculate a moving distance of the movable body from the first time to the second time based on results acquired by the first acquiring unit and the second acquiring unit.

Still another invention described in claims is a distance estimation method executed by a distance estimation device comprising: a first acquiring process configured to acquire distances from a movable body at a first time and a second time to two ground objects, respectively; a second acquiring process configured to acquire a distance between the two ground objects; and a calculating process configured to calculate a moving distance of the movable body from the first time to the second time based on results acquired by the first acquiring process and the second acquiring process.

Still another invention described in claims is a distance estimation method executed by a distance estimation device comprising: a first acquiring process configured to acquire distances from a movable body at a first time and a second time to at least three ground objects, respectively; a second acquiring process configured to acquire distances between the at least three ground objects, respectively; and a calculating process configured to calculate a moving distance of the movable body from the first time to the second time based on results acquired by the first acquiring process and the second acquiring process.

Still another invention described in claims is a program executed by a distance estimation device comprising a computer, the program causing the computer to function as: a first acquiring unit configured to acquire distances from a movable body at a first time and a second time to two ground objects, respectively; a second acquiring unit configured to acquire a distance between the two ground objects; and a calculating unit configured to calculate a moving distance of the movable body from the first time to the second time based on results acquired by the first acquiring unit and the second acquiring unit.

Still another invention described in claims is a program executed by a distance estimation device comprising a computer, the program causing the computer to function as: a first acquiring unit configured to acquire distances from a movable body at a first time and a second time to at least three ground objects, respectively; a second acquiring unit configured to acquire distances between the at least three ground objects, respectively; and a calculating unit configured to calculate a moving distance of the movable body from the first time to the second time based on results acquired by the first acquiring unit and the second acquiring unit.

BRIEF DESCRIPTION OF THE DRAWINGS

FIGS. 12A and 12B illustrate a relation between a traveling speed and a number of pulses in a unit time, and a relation between the traveling speed and a pulse width.

DETAILED DESCRIPTION OF THE PREFERRED EMBODIMENTS

Figure 1:
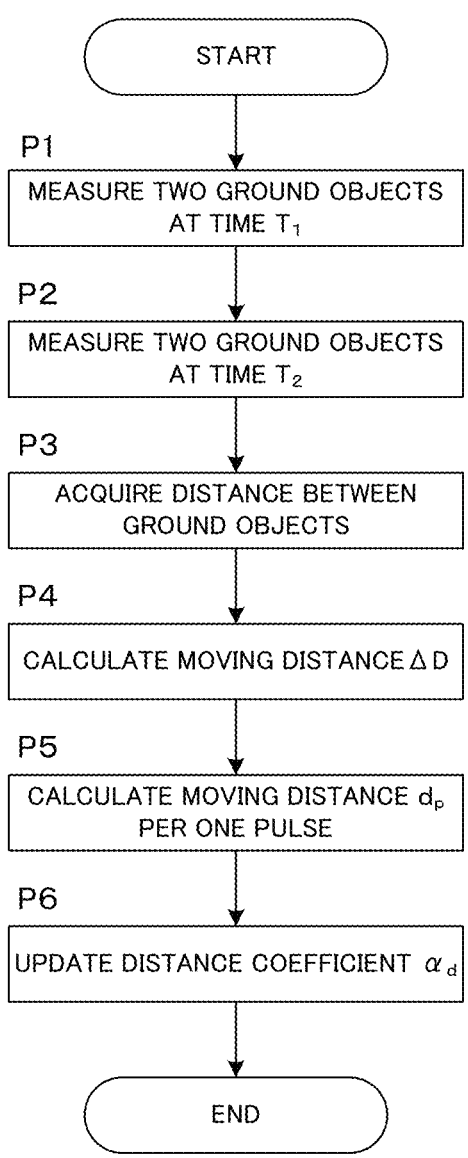
FIG. 1 is a flowchart illustrating distance coefficient updating processing according to embodiments.

According to one aspect of the present invention, there is provided a distance estimation device comprising: a first acquiring unit configured to acquire distances from a movable body at a first time and a second time to two ground objects, respectively; a second acquiring unit configured to acquire a distance between the two ground objects; and a calculating unit configured to calculate a moving distance of the movable body from the first time to the second time based on results acquired by the first acquiring unit and the second acquiring unit.

The above distance estimation device acquires distances from a movable body at a first time and a second time to two ground objects, respectively, and acquires a distance between the two ground objects. Then, the distance estimation device calculates a moving distance of the movable body from the first time to the second time based on the acquired results. Thus, the moving distance of the movable body can be calculated by using arbitrary ground objects measurable from the movable body.

According to another aspect of the present invention, there is provided a distance estimation device comprising: a first acquiring unit configured to acquire distances from a movable body at a first time and a second time to at least three ground objects, respectively; a second acquiring unit configured to acquire distances between the at least three ground objects, respectively; and a calculating unit configured to calculate a moving distance of the movable body from the first time to the second time based on results acquired by the first acquiring unit and the second acquiring unit.

The above distance estimation device acquires distances from a movable body at a first time and a second time to at least three ground objects, respectively, and acquires distances between the at least three ground objects, respectively. Then, the distance estimation device calculates a moving distance of the movable body from the first time to the second time based on the acquired results. Thus, the moving distance of the movable body can be calculated by using arbitrary ground objects measurable from the movable body.

In one mode of the above distance estimation device, the calculating unit calculates the moving distance per one pulse of a vehicle speed pulse signal based on the moving distance from the first time to the second time and an average pulse width of the vehicle speed pulse signal. Thus, the vehicle speed pulse signal can be calibrated based on the calculated moving distance.

In another mode of the above distance estimation device, the calculating unit calculates the moving distance when an angular velocity in a yaw direction or a steering angle of the movable body is smaller than a predetermined threshold value. Thus, accuracy of calculating the moving distance may be improved.

In a preferred example of the above distance estimation device, the second acquiring unit acquires the distance between the two ground objects based on the distances to the two ground objects acquired by the first acquiring unit and angles formed by a traveling direction of the movable body and respective directions of the two ground objects. In another preferred example, the second acquiring unit acquires the distance between the two ground objects based on map information.

In still another mode of the above distance estimation device, the calculating unit changes a time interval from the first time to the second time in accordance with a traveling speed of the movable body. Thus, accuracy of calculating the moving distance may be improved. Preferably, the calculating unit makes the time interval shorter as the traveling speed of the movable body becomes higher.

According to still another aspect of the present invention, there is provided a distance estimation method executed by a distance estimation device comprising: a first acquiring process configured to acquire distances from a movable body at a first time and a second time to two ground objects, respectively; a second acquiring process configured to acquire a distance between the two ground objects; and a calculating process configured to calculate a moving distance of the movable body from the first time to the second time based on results acquired by the first acquiring process and the second acquiring process. Thus, the moving distance of the movable body can be calculated by using arbitrary ground objects measurable from the movable body.

According to still another aspect of the present invention, there is provided a distance estimation method executed by a distance estimation device comprising: a first acquiring process configured to acquire distances from a movable body at a first time and a second time to at least three ground objects, respectively; a second acquiring process configured to acquire distances between the at least three ground objects, respectively; and a calculating process configured to calculate a moving distance of the movable body from the first time to the second time based on results acquired by the first acquiring process and the second acquiring process. Thus, the moving distance of the movable body can be calculated by using arbitrary ground objects measurable from the movable body.

According to still another aspect of the present invention, there is provided a program executed by a distance estimation device comprising a computer, the program causing the computer to function as: a first acquiring unit configured to acquire distances from a movable body at a first time and a second time to two ground objects, respectively; a second acquiring unit configured to acquire a distance between the two ground objects; and a calculating unit configured to calculate a moving distance of the movable body from the first time to the second time based on results acquired by the first acquiring unit and the second acquiring unit. Thus, the moving distance of the movable body can be calculated by using arbitrary ground objects measurable from the movable body.

According to still another aspect of the present invention, there is provided a program executed by a distance estimation device comprising a computer, the program causing the computer to function as: a first acquiring unit configured to acquire distances from a movable body at a first time and a second time to at least three ground objects, respectively; a second acquiring unit configured to acquire distances between the at least three ground objects, respectively; and a calculating unit configured to calculate a moving distance of the movable body from the first time to the second time based on results acquired by the first acquiring unit and the second acquiring unit. Thus, the moving distance of the movable body can be calculated by using arbitrary ground objects measurable from the movable body.

The above program can be used in a manner stored on a storage medium.

Embodiments

Preferred embodiments of the present invention will be described below with reference to the attached drawings. The following description will be directed to the embodiments wherein a moving distance of a movable body acquired by a distance estimation method of the present invention is used in calibration of the vehicle speed pulses of the vehicle.

Background

A self-position estimation system installed in a present car navigation device detects a vehicle speed by a vehicle speed sensor and a traveling direction by an angular velocity sensor or a steering angle sensor, thereby to measure a moving state of the vehicle, and estimates a current position by integrating those information with information measured by a GPS or an external field sensor. Therefore, in order to improve accuracy of estimating the self-position, it is required to detect the vehicle speed with high accuracy.

The vehicle speed sensor outputs a vehicle speed pulse signal at the time interval proportional to the rotational speed of the output shaft of the transmission or the wheels, for example. Then, as indicated by the following equation (1), the vehicle speed v can be calculated by dividing the distance coefficient $\alpha_d$ by the pulse width $t_p$. This distance coefficient $\alpha_d$ is a moving distance per one pulse of the vehicle speed pulse signal.

$$v = \frac{\alpha_d}{t_p} \quad (1)$$

The moving distance per one pulse is different between vehicle types. Also, if the outside diameter of the tires change due to the variation of the air pressure of the tire or the tire exchange, the moving distance per one pulse changes. Further, the moving distance per one pulse changes dependently upon the traveling speed. Normally, due to the traveling resistance, there is a difference between the vehicle wheel speed obtained from the vehicle speed pulses and the actual vehicle body speed. Since the traveling resistance during the high speed traveling becomes larger than that during the low speed traveling, the speed difference between the vehicle wheel speed and the vehicle body speed during the high speed traveling becomes larger than that during the low speed traveling. Therefore, the moving distance per one pulse during the high speed traveling is different from that during the low speed traveling. For this reason, in order to acquire the vehicle speed with high accuracy, it is necessary to appropriately calibrate and update the distance coefficient.

Conventionally, when the distance coefficient is calibrated, information acquired from the GPS is used as a reference. For example, the moving distance $d_p$ per one pulse is calculated by the following equation (2) using the vehicle moving distance $\Delta D$ calculated from the GPS position obtained from the GPS and the number n of the vehicle speed pulses, and the correction is constantly made by applying averaging processing.

$$d_p = \frac{\Delta D}{n} \quad (2)$$

However, according to the condition, the GPS information itself, serving as the reference, may include large error, and when the calibration calculation is made by using the GPS information including large error as the reference, the distance coefficient may deviate from a true value. In order to obtain the GPS information used as the reference more accurately, the condition should be made stricter. However, as the condition is made stricter, there occurs such a conflicting problem that the reference information can be obtained less frequently and the progress of the calibration becomes slow.

[Distance Coefficient Updating Processing]

In the above view, a distance coefficient updating device (hereinafter simply referred to as "updating device") does not use the GPS information as the reference, and calculates the moving distance of the vehicle based on the measurement of the ground objects by the external field sensor and uses it as the reference for calibrating the vehicle speed pulse signal. As the external field sensor, a camera, a LiDAR (Light Detection And Ranging) or a millimeter wave radar may be used.

FIG. 1 is a flowchart illustrating distance coefficient updating processing according to the embodiments. First, in the process P1, the updating device measures two ground objects by using the external field sensor at a time $T_1$. Next, in the process P2, the updating device measures the same two ground objects as those measured at the time $T_1$, at a time $T_2$ $\Delta T$ seconds elapsed from the time $T_1$. Next, in the process P3, the updating device acquires a relative distance between those two ground objects.

Next, in the process P4, the updating device calculates the moving distance $\Delta D$ of the vehicle from the time $T_1$ to the time $T_2$ by using the distances from the vehicle center position to each of the ground objects and the relative distance between the two ground objects acquired at the time $T_1$ and the time $T_2$.

Next, in the process P5, the updating device calculates the moving distance $d_p$ per one pulse by using the average pulse width $t_p$ of the vehicle speed pulse signal between the time $T_1$ and the time $T_2$, an elapsed time $\Delta T$ from the time $T_1$ to the time $T_2$ and the moving distance $\Delta D$ of the vehicle from the time $T_1$ to the time $T_2$ acquired in the process P4. Then, in the process P6, the updating device updates the distance coefficient $\alpha_d$ by using the moving distance $d_p$ per one pulse acquired in the processes P5 and P6.

Next, each process in the above distance coefficient updating processing will be described in detail.

(1) Acquiring distance between ground objects (Processes P1 to P3)

Figure 2:
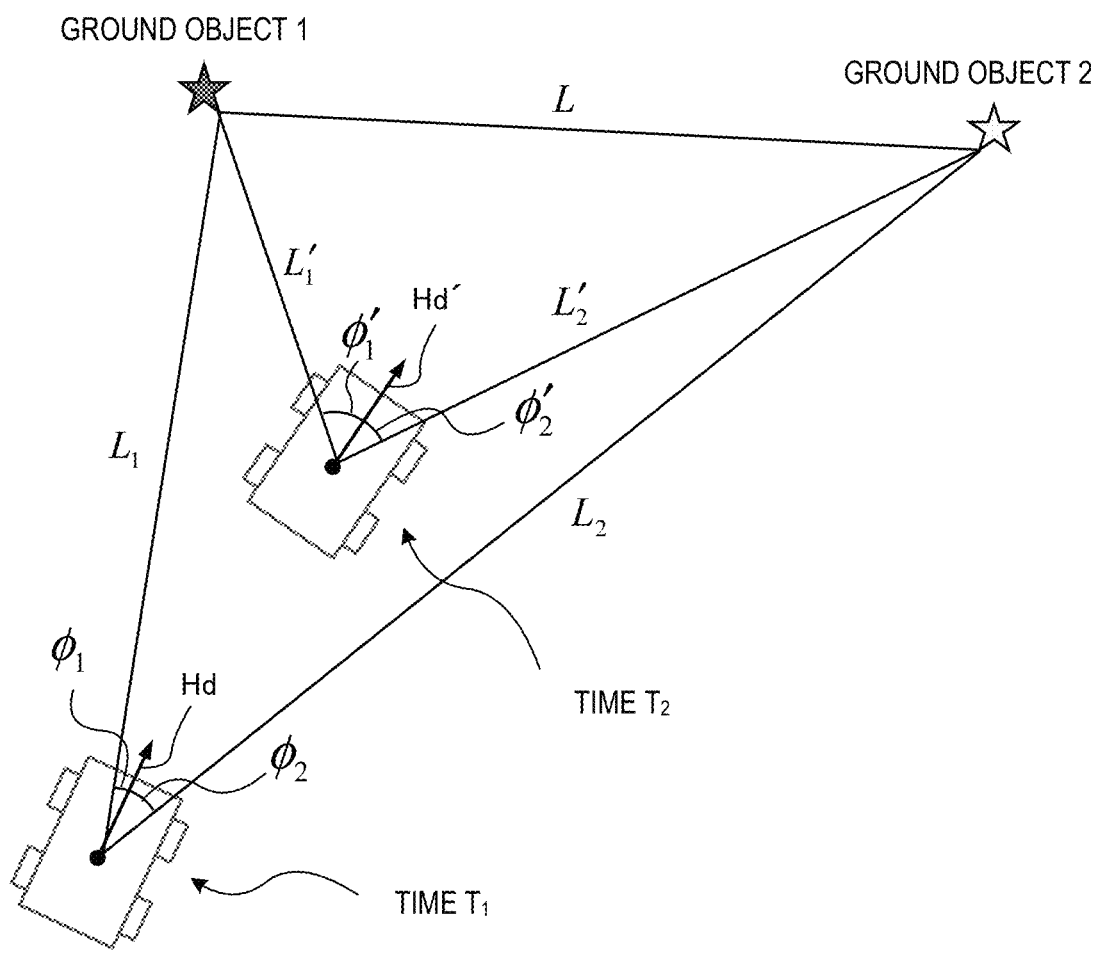
FIG. 2 illustrates a relation between two ground objects and a moving vehicle.

FIG. 2 illustrates an example of a positional relation between two ground objects and a movable body traveling. It is assumed that the vehicle moved from the time $T_1$ to the time $T_2$ as shown in FIG. 2. First, the updating device detects the ground object 1 and the ground object 2 at the time $T_1$, and acquires the distance $L_1$ from the vehicle to the ground object 1 and the angle $\phi_1$ formed by the traveling direction Hd of the vehicle and the direction of the ground object 1 as well as the distance $L_2$ from the vehicle to the ground object 2 and the angle $\phi_2$ formed by the traveling direction Hd of the vehicle and the direction of the ground object 2 (Process P1). At this time, the relative distance L between the ground object 1 and the ground object 2 can be calculated as follows by using $L_1$, $L_2$, $\phi_1$, $\phi_2$ (Process P3).

$$L^2 = L_1^2 + L_2^2 - 2L_1L_2\cos(\phi_1+\phi_2) \Leftrightarrow L = \sqrt{L_1^2+L_2^2-2L_1L_2\cos(\phi_1+\phi_2)} \quad (3)$$

Next, the updating device detects the ground object 1 and the ground object 2 at the time $T_2$ similarly to the time $T_1$, and acquires the distance $L'_1$ from the vehicle to the ground object 1 and the angle $\phi'_1$ formed by the traveling direction Hd' of the vehicle and the direction of the ground object 1 as well as the distance $L'_2$ from the vehicle to the ground object 2 and the angle $\phi'_2$ formed by the traveling direction Hd' of the vehicle and the direction of the ground object 2 (Process P2). At this time, similarly to the time $T_1$, the relative distance between the ground objects can be calculated by using $L'_1$, $L'_2$, $\phi'_1$, $\phi'_2$. The relative distance L' between the ground objects at the time $T_2$ is calculated by the following equation (Process P3).

$$L' = \sqrt{L_1'^2 + L_2'^2 - 2L_1'L_2'\cos(\phi_1'+\phi_2')} \quad (4)$$

When the moving distance $\Delta D$ of the vehicle is calculated in the process P4 described later, the updating device uses either one of the relative distance L and L' between the ground objects. Alternatively, the updating device may calculate an average value $L_{ave}$ of the relative distances L and L' by the following equation and use it.

$$L_{ave} = \frac{L+L'}{2} \quad (5)$$

In the following description, the relative distance between the ground objects will be expressed as "L".

In the above example, in the process P3, the relative distance L between the ground objects (hereinafter referred to as "inter-ground-object distance L") is acquired by an arithmetic operation based on the measurement results of the ground objects by the external field sensor. However, if high precision map data is available, the inter-ground-object distance L may be acquired from the high precision map data. In a case where the inter-ground-object distance L is calculated from the measurement results of the ground objects by the external field sensor, the inter-ground-object distance L may vary dependently upon the measurement accuracy of the ground objects. Namely, if the measurement accuracy is low, the accuracy of the calculated inter-ground-object distance L becomes low and the accuracy of the moving distance $\Delta D$ of the vehicle calculated thereafter also becomes low. In this respect, if the high precision map data is used, the inter-ground-object distance L may be acquired with high accuracy, and hence the accuracy of the moving distance $\Delta D$ of the vehicle may be improved.

(2) Calculating Moving Distance $\Delta D$ (Process P4)

Figure 3:
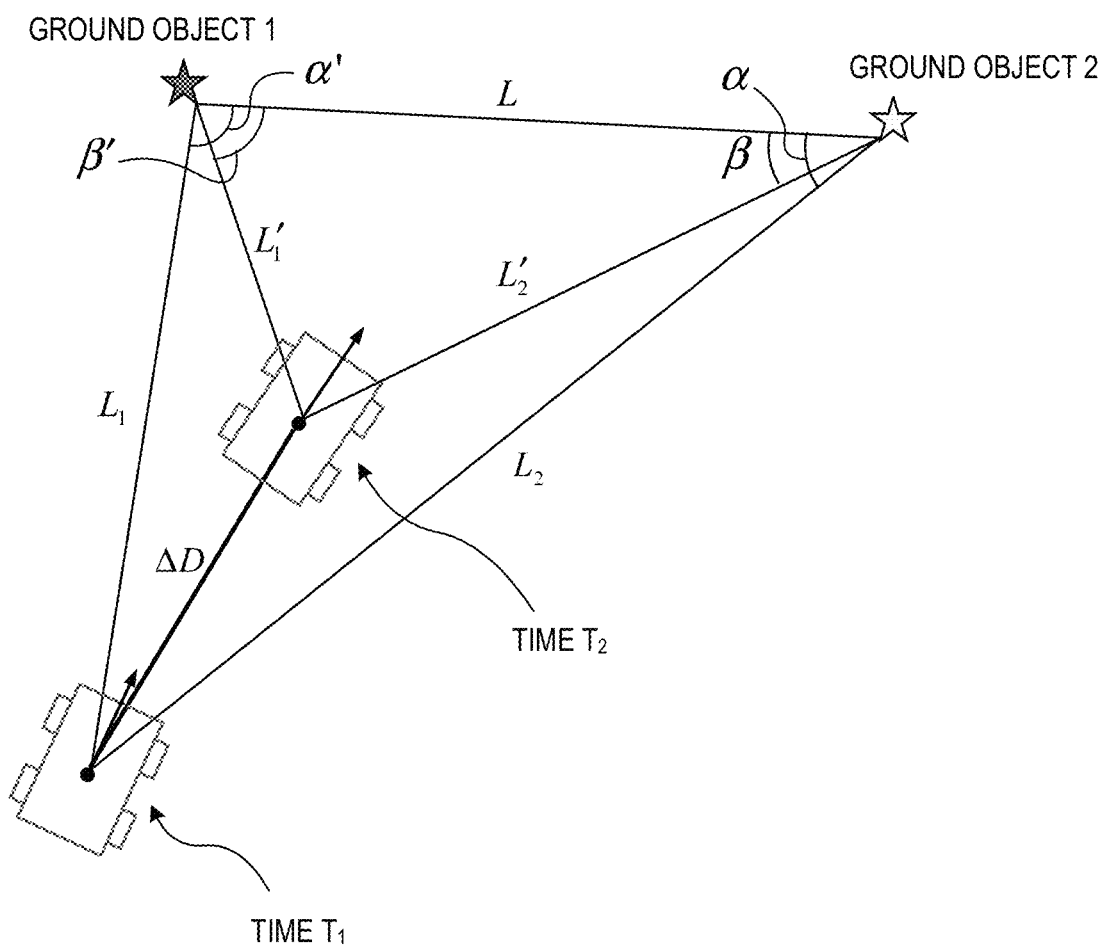
FIG. 3 illustrates a method of calculating a moving distance of the vehicle.

Next, the updating device calculates the moving distance $\Delta D$ of the vehicle from the time $T_1$ to the time $T_2$ by using the distances $L_1$, $L_2$ acquired at the time $T_1$, the distances $L'_1$, $L'_2$ acquired at the time $T_2$ and the inter-ground-object distance L. FIG. 3 illustrates a calculation method of the moving distance $\Delta D$. In FIG. 3, the angle $\alpha$ is calculated by the cosine theorem as follows.

$$L_1^2 = L^2 + L_2^2 - 2LL_2\cos\alpha \quad (6)$$

$$\cos\alpha = \frac{L^2 + L_2^2 - L_1^2}{2LL_2}$$

$$\alpha = \arccos\left(\frac{L^2 + L_2^2 - L_1^2}{2LL_2}\right)$$

Similarly, the angle $\beta$ is calculated by the cosine theorem as follows.

$$L_1'^2 = L^2 + L_2'^2 - 2LL_2'\cos\beta \quad (7)$$

$$\cos\beta = \frac{L^2 + L_2'^2 - L_1'^2}{2LL_2'}$$

$$\beta = \arccos\left(\frac{L^2 + L_2'^2 - L_1'^2}{2LL_2'}\right)$$

Therefore, the moving distance $\Delta D$ is calculated by the cosine theorem as follows.

$$\Delta D^2 = L_2^2 + L_2'^2 - 2L_2L_2'\cos(\alpha-\beta) \quad (8)$$

$$\Delta D = \sqrt{L_2^2 + L_2'^2 - 2L_2L_2'\cos(\alpha-\beta)}$$

While the moving distance $\Delta D$ is calculated by using the angles $\alpha$, $\beta$ on the ground object 2 side in FIG. 3, the moving distance $\Delta D$ may be calculated by using the angles $\alpha'$, $\beta'$ on the ground object 1 side instead. Alternatively, an average value of the moving distances $\Delta D$ calculated by the above methods may be calculated.

(3) Calculating Moving Distance $d_p$ Per One Pulse (Process P5)

Next, the updating device calculates the moving distance $d_p$ per one pulse as follows by using the moving distance $\Delta D$ of the vehicle in the time period $\Delta T$ from the time $T_1$ to the time $T_2$ and the average pulse width $t_p$ of the vehicle speed pulse signal.

$$d_p = \frac{\Delta D}{\Delta T} \cdot t_p \quad (9)$$

Figure 4:
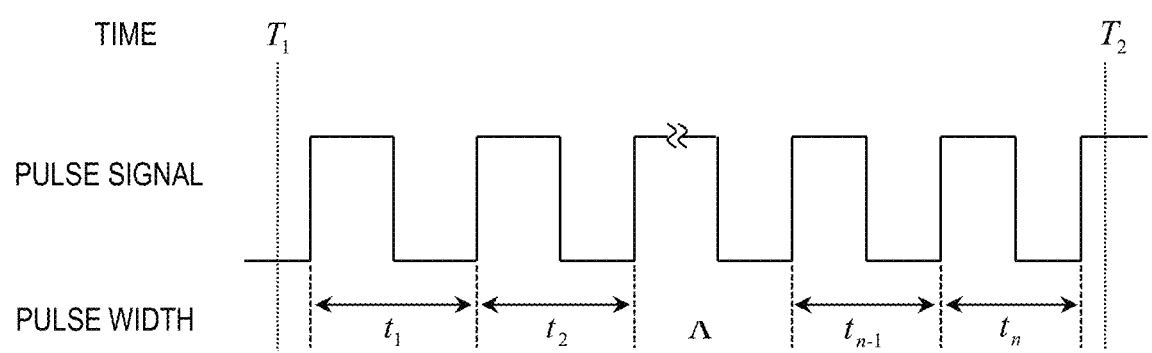
FIG. 4 is a diagram for explaining an average pulse width.

FIG. 4 is a diagram explaining the average pulse width $t_p$. The average pulse width $t_p$ may be calculated by buffering the pulse widths measured from the time $T_1$ and to the time $T_2$ and averaging them by the following equation (10).

$$t_p = \frac{1}{n}\sum_{k=1}^{n} t_k \quad (10)$$

Instead, the average pulse width $t_p$ may be calculated by a sequential calculation using the equation (11). If the average pulse width $t_p$ is calculated by the sequential calculation, it is not necessary to buffer the measured pulse widths and hence the usage amount of the memory in the device may be reduced.

$$t_p = t_p + \frac{t_k - t_p}{k} \quad (11)$$

Figure 5:
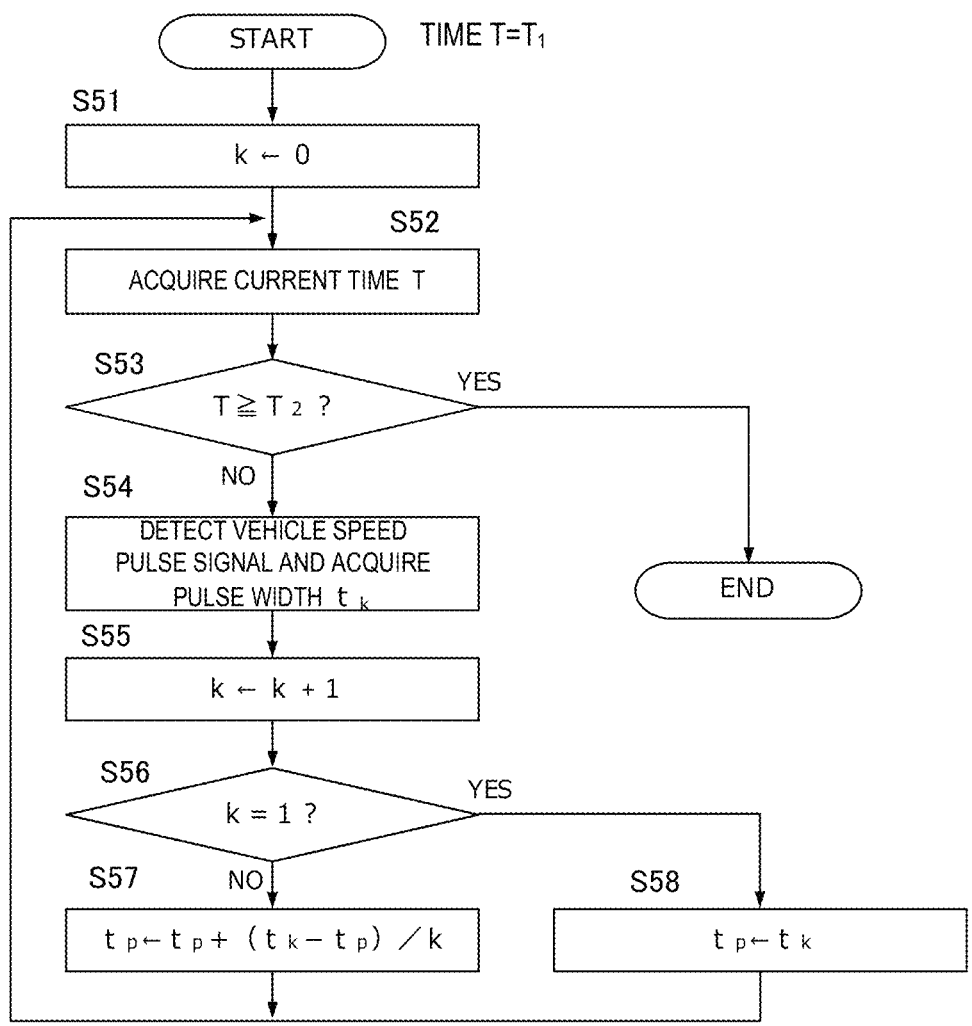
FIG. 5 is a flowchart of processing for calculating the average pulse width by sequential calculation.

FIG. 5 is a flowchart of the processing for calculating the average pulse width by the sequential calculation. First, at the time T=T$_1$, the updating device resets the coefficient k indicating the number of detected pulses to "0" (step S51), and acquire the current time T (step S52). Next, the updating device determines whether or not the current time T becomes the time T$_2$ (step S53).

If the current time T does not become the time T$_2$ (step S53: NO), the updating device detects the vehicle speed pulse signal and acquires the pulse width $t_k$ (step S54). Next, the updating device increments the coefficient k by "1" (step S55), and determines whether or not the coefficient k is equal to "1" (step S56).

If the coefficient k is equal to "1" (step S56: YES), the updating device substitutes the pulse width $t_k$ for the average pulse width $t_p$ (step S58), and returns to step S52. On the contrary, if the coefficient k is not equal to "1" (step S56: NO), the updating device adds the value $(t_k-t_p)/k$ calculated by subtracting the difference between the average pulse width $t_p$ at that time and the pulse width $t_k$ at present by the coefficient k, i.e., the variation of the average pulse width $t_p$ due to the pulse width $t_k$ at present, to the average pulse width $t_p$ at that time to update the average pulse width $t_p$, and returns to step S52. Then, if the current time T becomes the time T$_2$ (step S53: YES), the processing ends.

(4) Updating Distance Coefficient $\alpha_d$ (Process P6)

Next, the updating device updates the distance coefficient $\alpha_d$ by using the moving distance $d_p$ acquired in the process P5. Specifically, the updating device sets the moving distance $d_p$ to a new distance coefficient $\alpha_d$. The distance coefficient $\alpha_d$ thus updated is used for the calculation of the vehicle speed v by the equation (1).

(5) Method of Projecting Three-Dimensional Position of Ground Object to Horizontal Plane of Vehicle The above description is based on the assumption that the road surface is a plane, the vehicle moves in the plane and the ground objects exist on the same plane as the vehicle. However, many of the ground objects such as road signs and traffic signals in the real environment have a height in the space. Therefore, by projecting the three-dimensional coordinates of the ground object to the horizontal plane of the vehicle, the moving distance of the vehicle may be calculated by the same method as described above. This method will be described below.

Figure 6A:
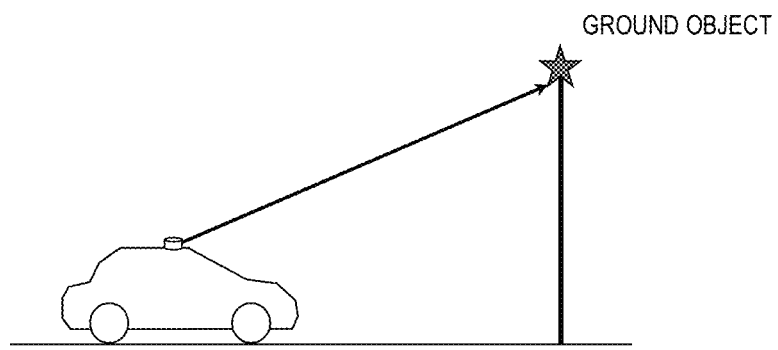
FIGS. 6A to 6C illustrate a method of projecting a three-dimensional position of the ground object to the horizontal plane of the vehicle.
Figure 6B:
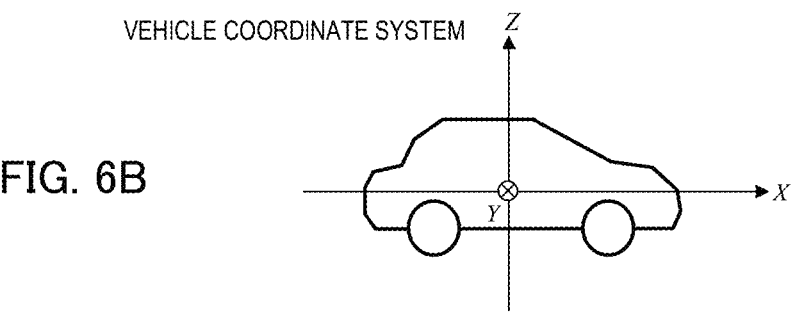
Figure 6C:
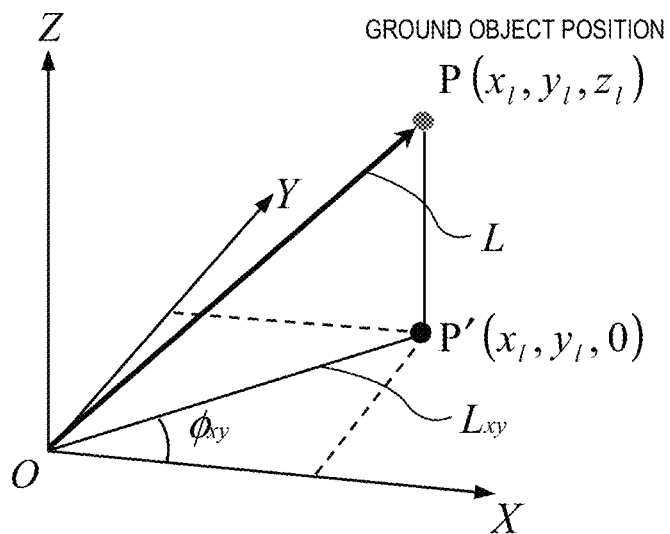

A vehicle coordinate system (XYZ coordinate system) is defined as shown in FIG. 6B. Here, the X-axis indicates the traveling direction of the vehicle, the Y-axis indicates a direction perpendicular to the traveling direction of the vehicle within the horizontal plane of the vehicle, and the Z-axis indicates the height direction of the vehicle.

(i) In a case where three-dimensional position of ground object can be acquired

In a case where the three-dimensional coordinates of the ground object can be acquired by using the external field sensor capable of measuring the three-dimensional position of the ground object, or in a case where the three-dimensional coordinate data is included in the map data, it is now assumed that the three-dimensional coordinate P of the ground object in the vehicle coordinate system can be acquired.

In this case, supposing that the foot of the perpendicular line drawn from the point P to the X-Y plane is the point P', the length L$_{xy}$ of the segment OP' and the angle $\phi_{xy}$ formed by the segment OP' and the X-axis can be calculated as follows.

$$L_{xy} = \sqrt{x_l^2 + y_l^2} \quad (12\text{-}1)$$

$$\phi_{xy} = \arctan\left(\frac{y_l}{x_l}\right) \quad (12\text{-}2)$$

Therefore, the processing in the processes P1 to P4 may calculates the horizontal distance L$_{xy}$ and the angle $\phi_{xy}$ by using the equations (12-1) and (12-2) and use them. Specifically, in the process P1, the horizontal distances L$_{1xy}$, L$_{2xy}$ and the angles $\phi_{1xy}$, $\phi_{2xy}$ are calculated. Similarly, in the process P2, the horizontal distances L'$_{1xy}$, L'$_{2xy}$ and the angles $\phi'_{1xy}$, $\phi'_{2xy}$ are calculated. Then, the inter-ground-object distances L and L' are calculated in the process P3, and the moving distance ΔD is calculated in the process P4.

(ii) In a case where distance and angle to ground object can be acquired

Figure 7:
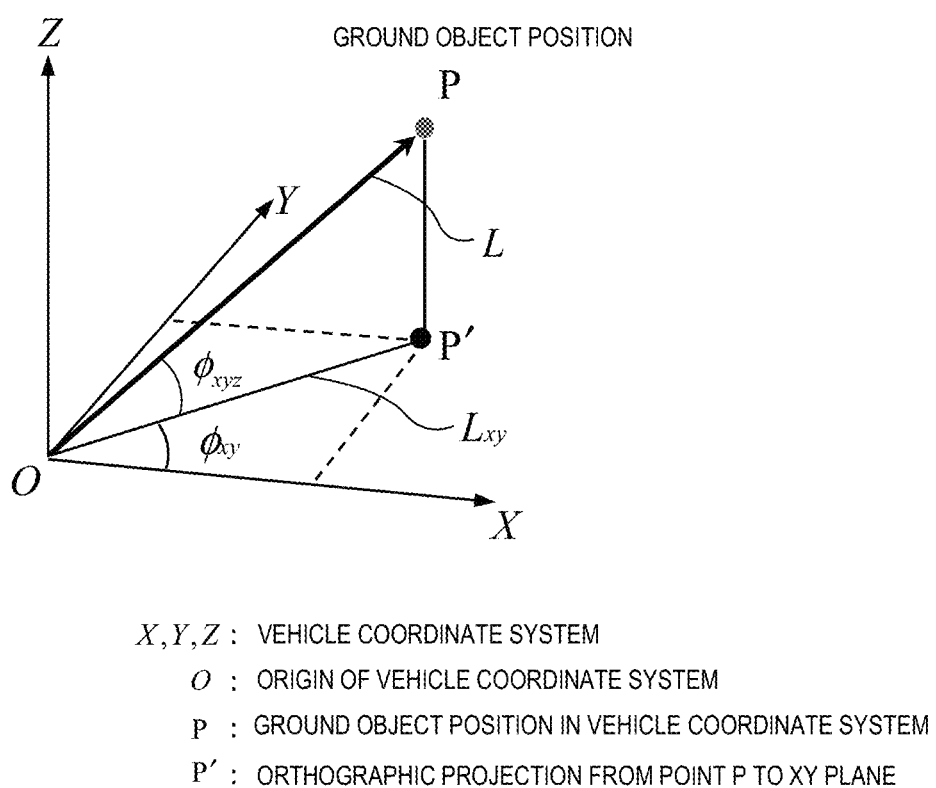
FIG. 7 illustrates another method of projecting a three-dimensional position of the ground object to the horizontal plane of the vehicle.

It is now assumed that the distance L from the vehicle to the ground object, the azimuth angle $\phi_{xy}$ of the ground object with respect to the traveling direction of the vehicle (X-axis of the vehicle coordinate system) and the elevation angle $\phi_{xyz}$ of the ground object with respect to the horizontal plane of the vehicle (X-Y plane of the vehicle coordinate system) can be calculated by using the external field sensor capable of measuring the distance to and the angle of the ground object as shown in FIG. 7.

In this case, supposing that the foot of the perpendicular line drawn from the point P to the X-Y plane is the point P', the length L$_{xy}$ of the segment OP' can be calculated as follows.

$$L_{xy} = L \cos \phi_{xyz} \quad (13)$$

Therefore, similarly to the above case (i), the processing in the processes P1 to P4 may use the horizontal distance L$_{xy}$ and the angle $\phi_{xy}$ acquired by the equation (13).

1st Embodiment

Figure 8:
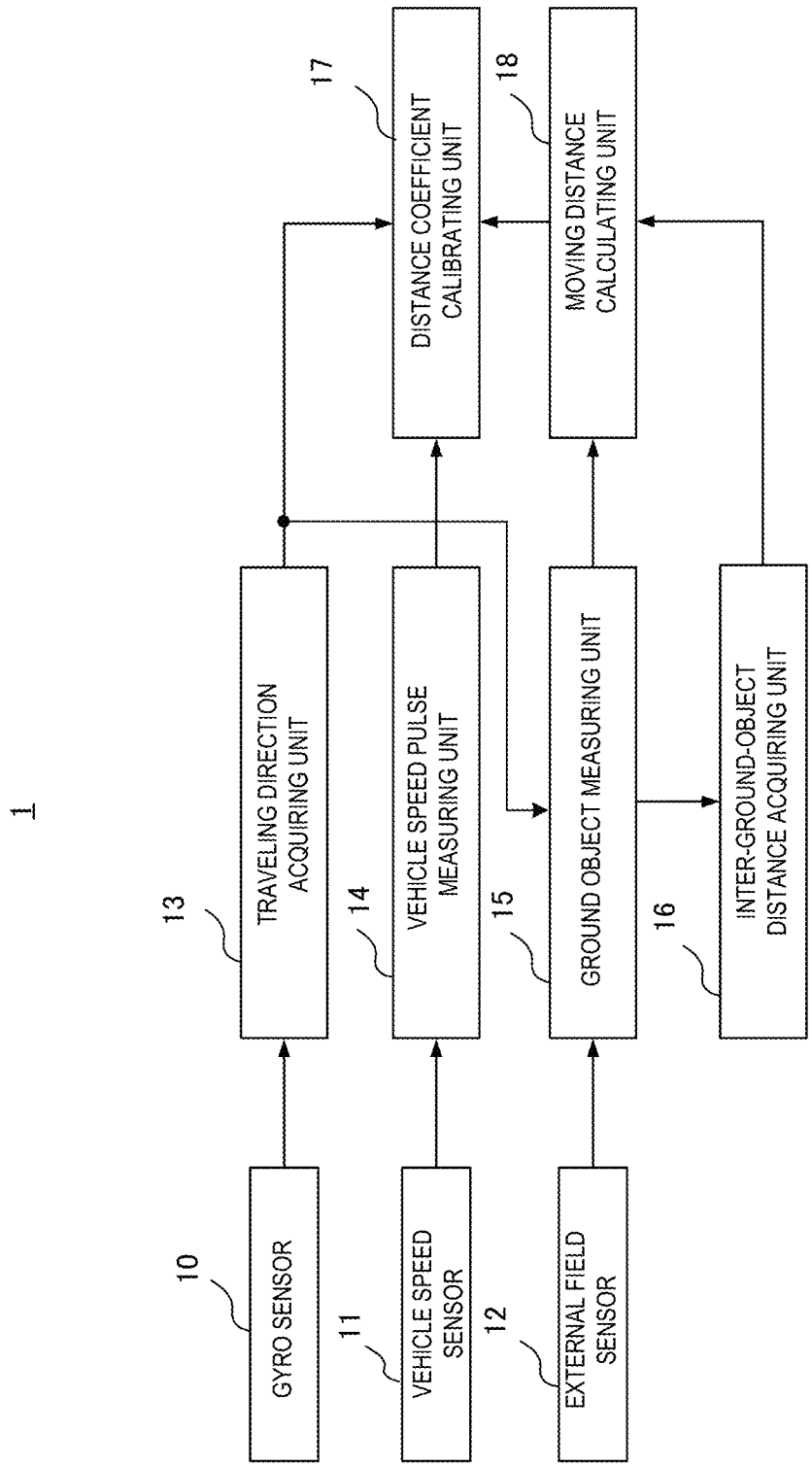
FIG. 8 is a block diagram illustrating a configuration of a distance coefficient updating device according to a first embodiment.

Next, the first embodiment of the above updating device will be described. FIG. 8 is a block diagram illustrating a configuration of the updating device 1 according to the first embodiment. In the first embodiment, the updating device 1 calculates the inter-ground-object distance L by arithmetic operation based on the measurement results of two ground objects by the external field sensor.

As illustrated, the updating device 1 includes a gyro sensor 10, a vehicle speed sensor 11, an external field sensor 12, a traveling direction acquiring unit 13, a vehicle speed pulse measuring unit 14, a ground object measuring unit 15, an inter-ground-object distance acquiring unit 16, a distance coefficient calibrating unit 17 and a moving distance calculating unit 18. The traveling direction acquiring unit 13, the vehicle speed pulse measuring unit 14, the ground object measuring unit 15, the inter-ground-object distance acquiring unit 16, the distance coefficient calibrating unit 17 and the moving distance calculating unit 18 may be realized by a computer such as a CPU which executes a program prepared in advance.

The traveling direction acquiring unit 13 acquires the traveling direction Hd of the vehicle based on the output from the gyro sensor 10, and supplies it to the ground object measuring unit 15 and the distance coefficient calibrating unit 17. The vehicle speed pulse measuring unit 14 measures the vehicle speed pulses outputted from the vehicle speed sensor 11, calculates the average pulse width $t_p$ of the vehicle speed pulse signal and supplies it to the distance coefficient calibrating unit 17.

The external field sensor 12 may be a camera, a LiDAR and a millimeter wave radar, for example, and the ground object measuring unit 15 measures the distance to the ground object based on the output from the external field sensor 12. Specifically, the ground object measuring unit 15 measures the distances $L_1$, $L_2$ from the vehicle to the two ground objects at the time $T_1$, calculates the angles $\phi_1$, $\phi_2$ formed by the traveling direction Hd supplied from the traveling direction acquiring unit 13 and the directions of the two ground objects, and supplies them to the inter-ground-object distance acquiring unit 16 and the moving distance calculating unit 18. Also, the ground object measuring unit 15 measures the distances $L'_1$, $L'_2$ from the vehicle to the two ground objects at the time $T_2$, calculates the angles $\phi'_1$, $\phi'_2$ formed by the traveling direction Hd' supplied from the traveling direction acquiring unit 13 and the directions of the two ground objects, and supplies them to the inter-ground-object distance acquiring unit 16 and the moving distance calculating unit 18.

The inter-ground-object distance acquiring unit 16 calculates the inter-ground-object distance L by the above equation (3) based on the distances $L_1$, $L_2$ and the angles $\phi_1$, $\phi_2$ for the two ground objects measured by the ground object measuring unit 15, and supplies them to the moving distance calculating unit 18.

The moving distance calculating unit 18 calculates the moving distance ΔD of the vehicle by the above equations (6) to (8) based on the distances $L_1$, $L_2$, $L'_1$, $L'_2$ supplied from the ground object measuring unit 15 and the inter-ground-object distance L calculated by the inter-ground-object distance acquiring unit 16, and supplies it to the distance coefficient calibrating unit 17.

The distance coefficient calibrating unit 17 calculates the moving distance $d_p$ per one pulse (i.e., the distance coefficient $\alpha_d$) based on the average pulse width $t_p$ supplied from the vehicle speed pulse measuring unit 14 and the moving distance ΔD supplied from the moving distance calculating unit 18. From the moving distance per one pulse, the vehicle speed may be calculated.

Figure 9:
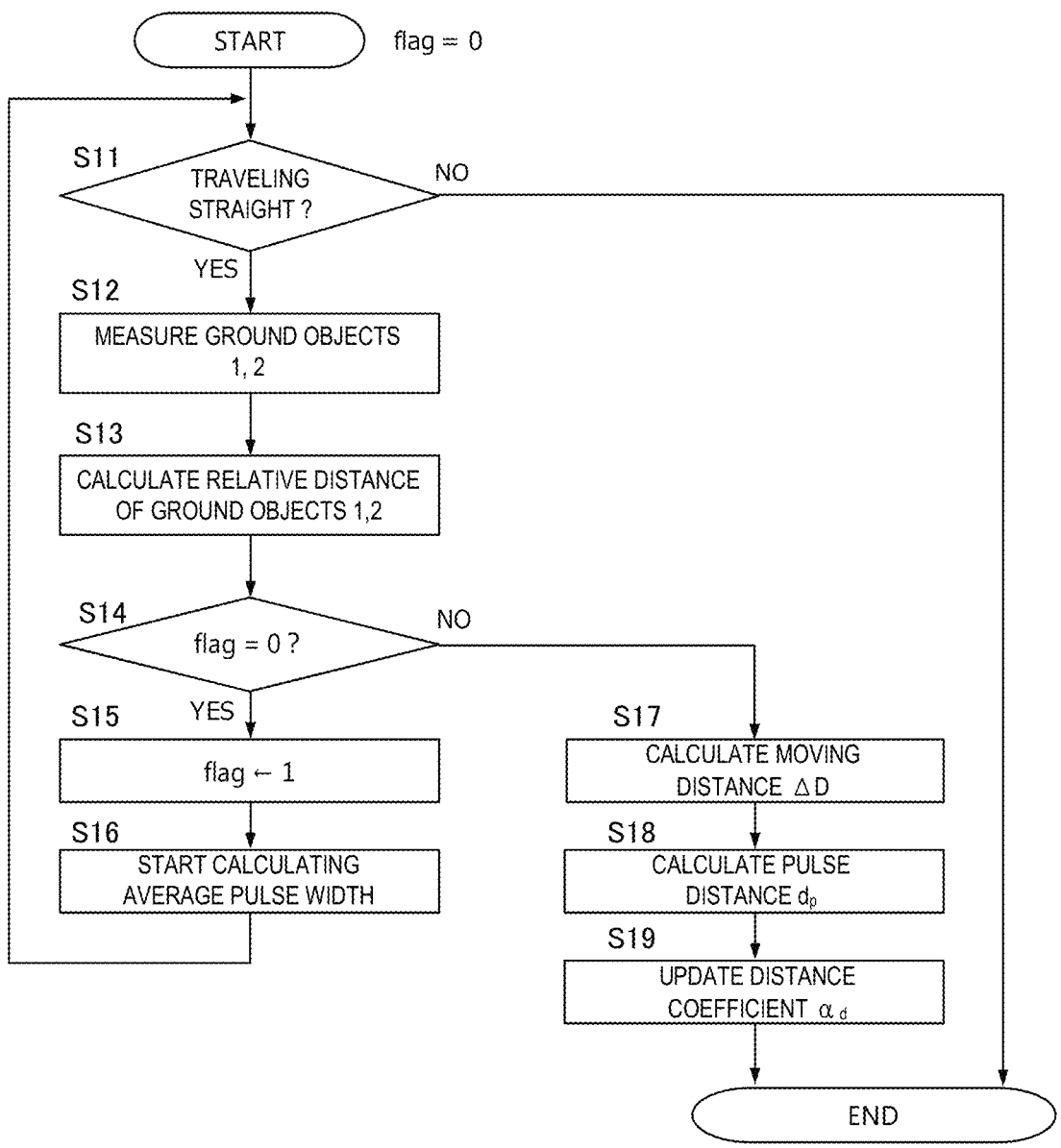
FIG. 9 is a flowchart of distance coefficient updating processing according to the first embodiment.

Next, the distance coefficient updating processing according to the first embodiment will be described. FIG. 9 is a flowchart of the distance coefficient updating processing according to the first embodiment.

First, the updating device 1 determines whether or not the vehicle is traveling straight based on the traveling direction of the vehicle outputted by the traveling direction acquiring unit 13 (step S11). This is because, if the vehicle is not traveling straight, the accuracy of the moving distance ΔD outputted by the moving distance calculating unit 18 is deteriorated. Specifically, in a case where the gyro sensor 10 can detect the angular velocity ω in the yaw direction of the vehicle, the updating device 1 may determine that the vehicle is traveling straight when $|\omega|<\Delta\omega$ (Δω: predetermined threshold value) is established. Also, in a case where the steering angle δ of the vehicle can be detected, the updating device 1 may determine that the vehicle is traveling straight when $|\delta|<\Delta\delta$ (Δδ: predetermined threshold value) is established.

When the vehicle is not traveling straight (step S11: NO), the processing ends. On the other hand, when the vehicle is traveling straight (step S11: YES), the updating device 1 measures two ground objects 1 and 2 (step S12), and calculates the relative distance L between them (step S13).

Next, the updating device 1 determines whether or not "flag=0" is established (step S14). It is noted that "flag" is reset at the start of the processing. When "flag=0" is established (step S14: YES), the updating device 1 sets "1" to "flag" (step S15), starts the calculation of the average pulse width $t_p$ (step S16), and returns to step S11.

On the other hand, when "flag=0" is not established (step S14: NO), the updating device 1 calculates the moving distance ΔD as described above (step S17), calculates the moving distance $d_p$ per one pulse by using the moving distance ΔD (step S18), and updates the distance coefficient $\alpha_d$ (step S19). Then, the processing ends.

2nd Embodiment

Figure 10:
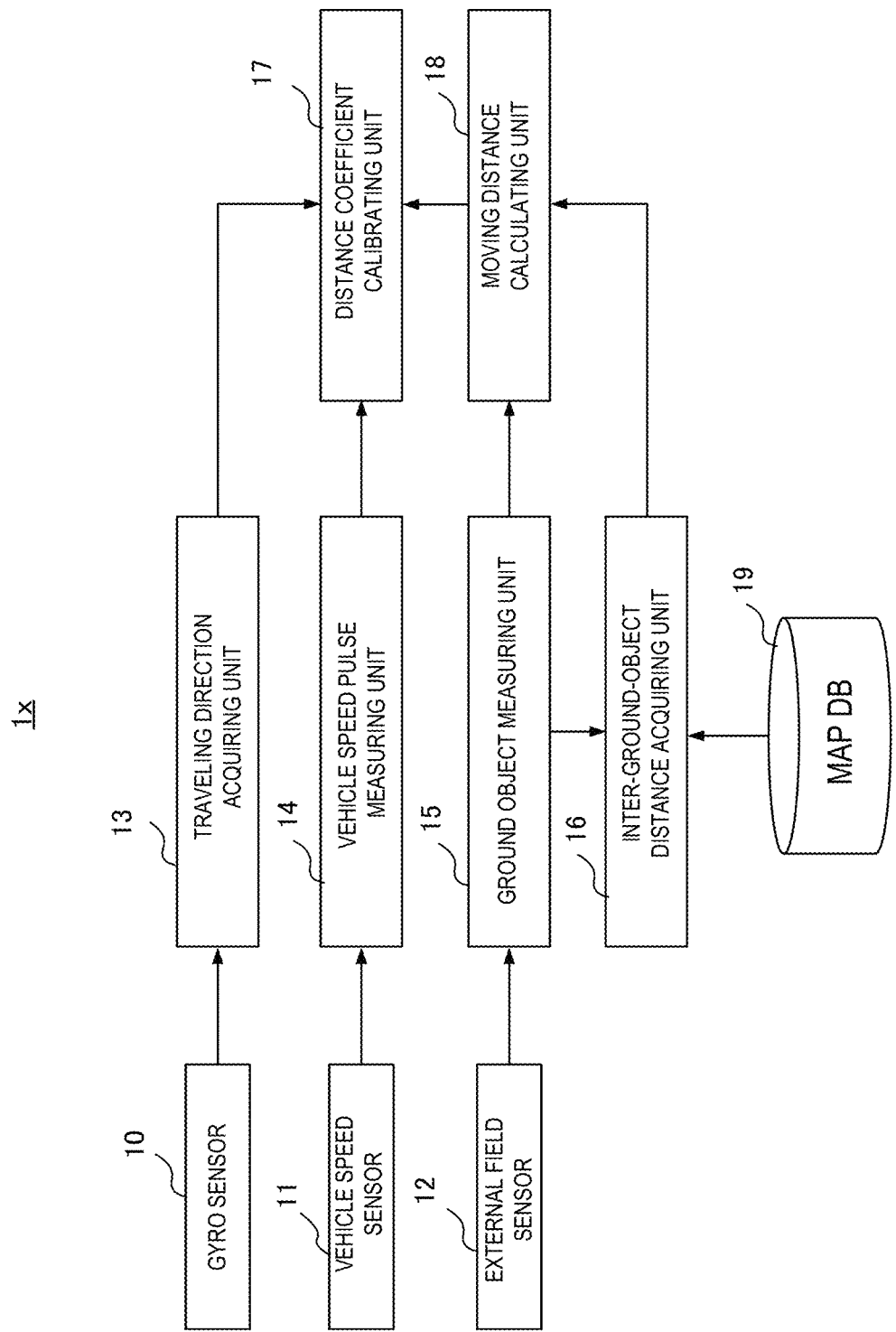
FIG. 10 is a block diagram illustrating a configuration of a distance coefficient updating device according to a second embodiment.

Next, the second embodiment of the above updating device will be described. FIG. 10 is a block diagram illustrating a configuration of an updating device 1x according to the second embodiment. While the updating device 1x is different from the updating device 1 in that the updating device 1x includes a map database (DB) 19 storing high precision map data, other constitutive elements are the same as the updating device 1 of the first embodiment, and therefore the description thereof will be omitted.

In the updating device 1x of the second embodiment, the inter-ground-object distance acquiring unit 16 acquires the inter-ground-object distance L between the two ground objects by using the high precision map data stored in the map DB 19.

Figure 11:
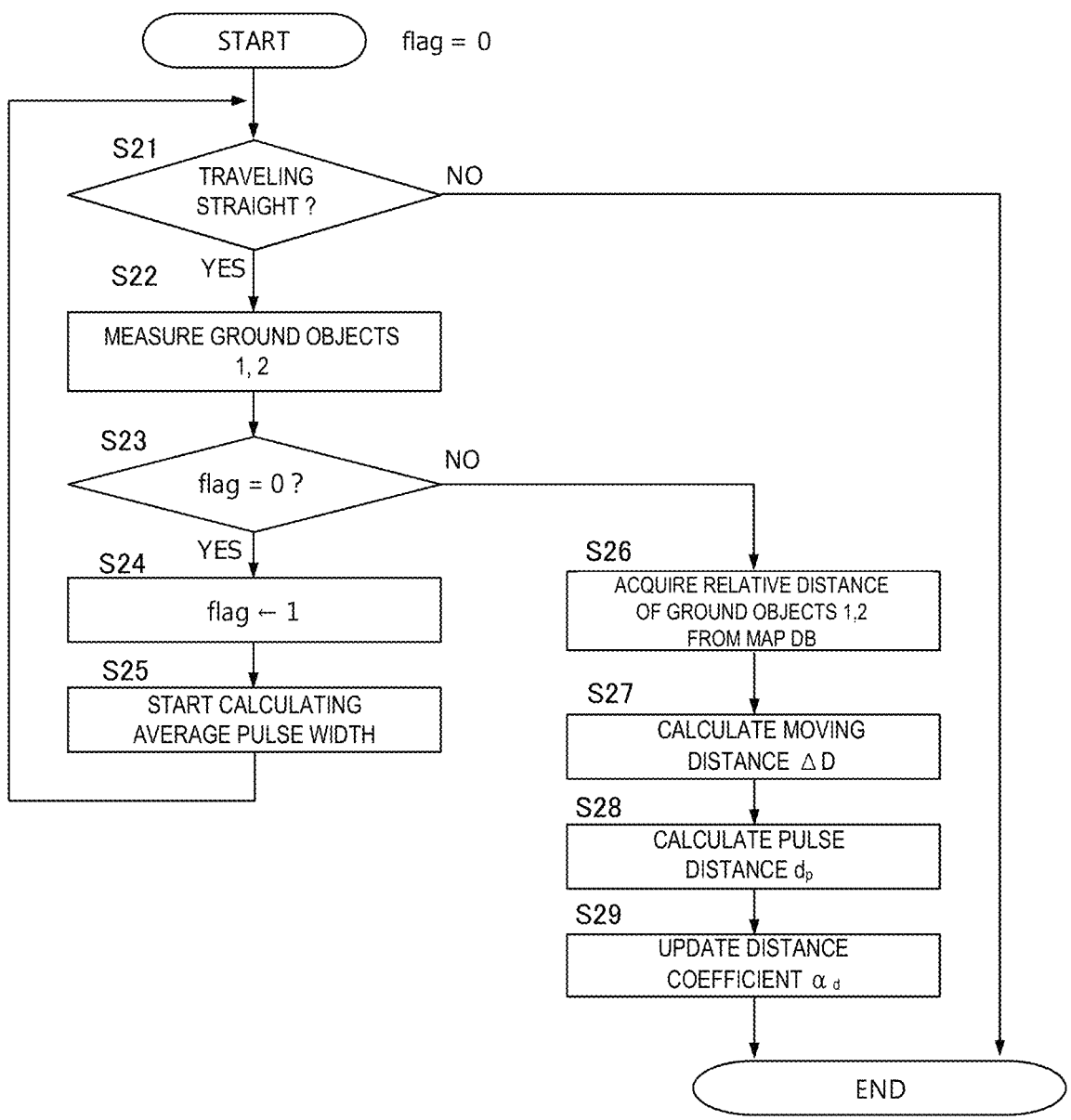
FIG. 11 is a flowchart of distance coefficient updating processing according to the second embodiment.

FIG. 11 is a flowchart illustrating the distance coefficient updating processing according to the second embodiment. In comparison with the distance coefficient updating processing shown in FIG. 9, the distance coefficient updating processing according to the second embodiment is different in that the inter-ground-object distance L is acquired from the map DB in step S26 instead of step S13 in the first embodiment, but other steps are basically the same as the distance coefficient updating processing according to the first embodiment. Specifically, steps S21 to S22, S23 to S25, S27 to S29 are the same as steps S11 to S12, S14 to S16, S17 to S19 in the distance coefficient updating processing according to the first embodiment, respectively.

[Cycle of Measuring Ground Object]

The moving distance $d_p$ per one pulse calculated in the above distance coefficient updating processing is the average of the moving distances per one pulse in the time interval ΔT from the time $T_1$ to the time $T_2$. Therefore, if the variation of the pulse widths in the time interval ΔT is large, the accuracy of the calculated moving distance $d_p$ is deteriorated. Accordingly, it is desired that the number of pulses in the time interval ΔT is as small as possible.

The number of pulses in a unit time is different dependently upon the traveling speed of the vehicle. For example, as shown in FIG. 12A, the number of pulses in one second is considered. In a type of vehicle in which two pulses are outputted during one revolution of the tire, the number of pulses per one second is 3 pulses at 10 km/h, 17 pulses at 50 km/h and 35 pulses at 100 km/h, and is largely different dependently upon the traveling speed.

Therefore, by changing the time interval ΔT according to the traveling speed in consideration of the measurement cycle of the external field sensor and the type of vehicle, it becomes possible to suppress the deterioration of the accuracy of the moving distance $d_p$ due to the variation of the pulse width. FIG. 12B illustrates the relation between the traveling speed and the pulse width. For example, if the measurement cycle of the external field sensor is 50 ms (20 Hz) and the vehicle is of the type in which two pulses are outputted per one revolution of the tire, the time interval $\Delta T$ is set to 300 ms when the traveling speed is lower than 20 km/h, set to 200 ms when the traveling speed is higher than 20 km/h and lower than 30 km/h, set to 100 ms when the traveling speed is higher than 30 km/h and lower than 60 km/h and set to 50 ms when the traveling speed is higher than 60 km/h. Thus, the number of pulses measured in the time interval $\Delta T$ becomes one or two, and the moving distance $d_p$ can be calculated with high accuracy.

MODIFIED EXAMPLES

1st Modified Example

In the above distance coefficient updating processing, two ground objects are measured. However, if three or more ground objects can be measured at the same time, it is possible to calculate the moving distance $\Delta D$ in plural combinations and use the average value of them to update the distance coefficient.

Figure 13:
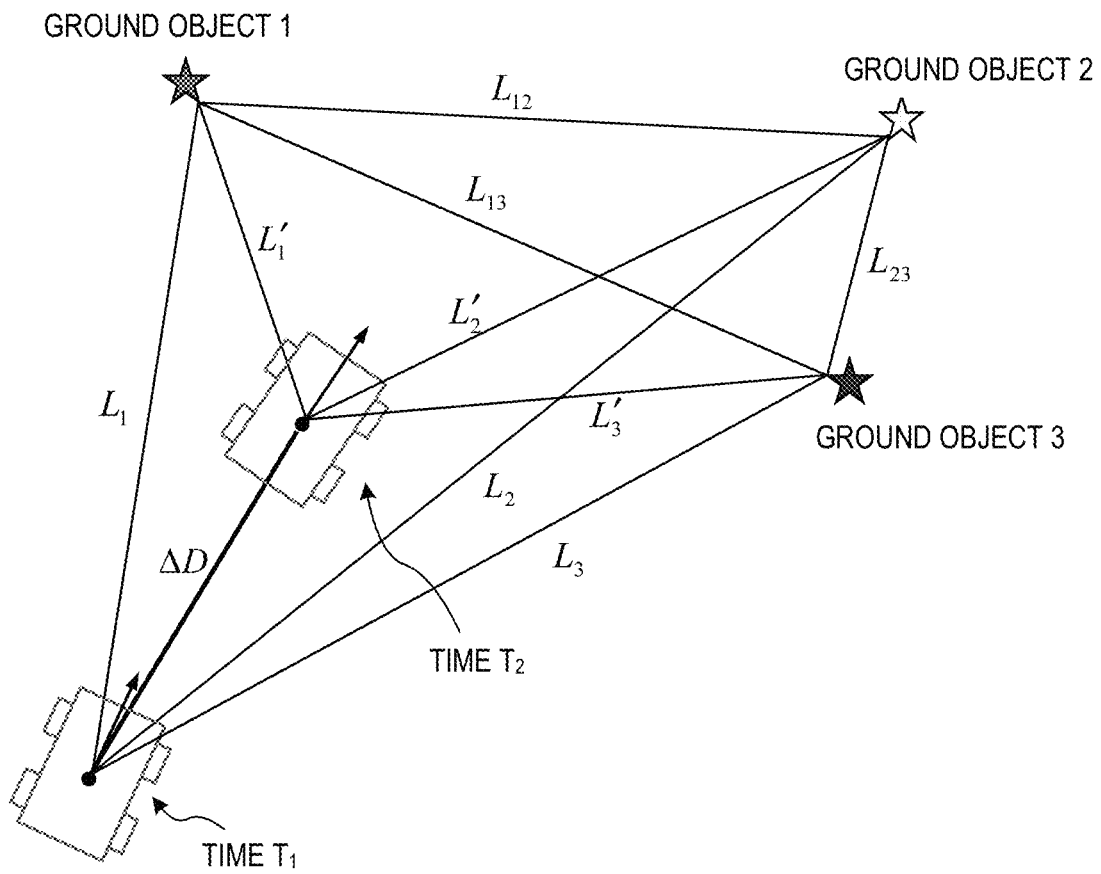
FIG. 13 illustrates a positional relation between three ground objects and a moving vehicle.

For example, if three ground objects can be measured, the combinations of the ground object 1 and the ground object 2, the ground object 2 and the ground object 3, the ground object 3 and the ground object 1 can be selected as shown in FIG. 13. For each combination, the moving distance from the time $T_1$ to the time $T_2$ is calculated by the method of the processes P1 to P3 described above. When the moving distance acquired from the combination of the ground object 1 and the ground object 2 is indicated as "$\Delta D_{12}$", the moving distance acquired from the combination of the ground object 2 and the ground object 3 is indicated as "$\Delta D_{23}$", the moving distance acquired from the combination of the ground object 3 and the ground object 1 is indicated as "$\Delta D_{31}$", the average value of them acquired by the following equation can be used as the moving distance $\Delta D$.

$$\Delta D = \frac{\Delta D_{12} + \Delta D_{23} + \Delta D_{31}}{3} \qquad (14)$$

Thus, the accuracy of the moving distance $\Delta D$ may be statistically improved, and the accuracy of the moving distance per one pulse may be improved.

2nd Modified Example

The inter-ground-object distance L is calculated from the measurement results of two ground objects in the first embodiment, and the inter-ground-object distance L is acquired by using the map data in the second embodiment. However, the above two methods may be used in combination. For example, the inter-ground-object distance L may be acquired by using the high precision map data in the area where the high precision map data exists, and the inter-ground-object distance L may be calculated from the measurement results of the ground objects in the area where the high precision map data does not exist. Also, one of the inter-ground-object distances L having higher accuracy may be used.

3rd Modified Example

As shown by step S11 in FIG. 9 and step S21 in FIG. 11, the distance coefficient updating processing of the embodiments basically updates the distance coefficient while the vehicle is traveling straight. However, even if the vehicle appears to be traveling straight, actually the vehicle is not strictly traveling straight sometimes and may have small staggering. Therefore, the moving distance $\Delta D$ acquired in the process P3 is not the actual moving distance but an approximate value. Accordingly, if the time interval $\Delta T$ is too large, the difference between the actual moving distance and the moving distance calculated in the process P4 becomes large. In this view, it is desired to make the time interval $\Delta T$ from the time $T_1$ to the time $T_2$ as short as possible.

4th Modified Example

If the external field sensor is mounted on a low position of the vehicle, occlusion by surrounding vehicles increases, and the frequency of detecting the ground objects suitable for updating the distance coefficient may decrease. Therefore, it is preferred that the external field sensor is mounted on a position to measure areas higher than the heights of the surrounding vehicles. Thus, the frequency of detecting the ground objects increases, the frequency of updating the distance coefficient also increases, and the accuracy of the distance coefficient can be improved.

INDUSTRIAL APPLICABILITY

This invention can be used for a device loaded on a movable body.

BRIEF DESCRIPTION OF REFERENCE NUMBERS

10 Gyro sensor
11 Vehicle speed sensor
12 External field sensor
13 Traveling direction acquiring unit
14 Vehicle pulse measuring unit
15 Ground object measuring unit
16 Inter-ground-object acquiring unit
17 Distance coefficient calibrating unit
18 Moving distance calculating unit
19 Map database

The invention claimed is:

1. A distance estimation device comprising:
a memory configured to store one or more programs; and
a central processing unit (CPU) coupled to the memory and configured to execute the one or more programs to:
acquire (i) first distances from a movable body to two ground objects and (ii) first angles formed by a traveling direction of the movable body and directions of the two ground objects, respectively, based on a first output from an external field sensor, on the movable body, measuring the two ground objects at a first time;
acquire (iii) second distances from the movable body to the two ground objects and (iv) second angles formed by a traveling direction of the movable body and directions of the two ground objects, respectively, based on a second output from the external field sensor measuring the two ground objects a second time;

acquire a distance between the two ground objects;
calculate a moving distance of the movable body from the first time to the second time based on the acquired first distances, first angles, second distances, second angles, and the acquired distance between the two ground objects; and
calibrate a movable body speed pulse signal by using the calculated moving distance.

2. The distance estimation device according to claim 1, wherein the CPU is further configured to execute the one or more programs to calculate the moving distance per one pulse of the movable body speed pulse signal based on the moving distance from the first time to the second time and an average pulse width of the movable body speed pulse signal.

3. The distance estimation device according to claim 1, wherein the CPU is further configured to execute the one or more programs to calculate the moving distance when an angular velocity in a yaw direction or a steering angle of the movable body is smaller than a predetermined threshold value.

4. The distance estimation device according to claim 1, wherein the CPU is further configured to execute the one or more programs to acquire the distance between the two ground objects based on the acquired first and second distances to the two ground objects and the acquired first and second angles formed by a traveling direction of the movable body and respective directions of the two ground objects.

5. The distance estimation device according to claim 1, wherein the CPU is further configured to execute the one or more programs to change a time interval from the first time to the second time in accordance with a traveling speed of the movable body.

6. The distance estimation device according to claim 5, wherein the CPU is further configured to execute the one or more programs to make the time interval shorter as the traveling speed of the movable body becomes higher.

7. The distance estimation device according to claim 1, wherein the CPU is further configured to execute the one or more programs to acquire the distance between the two ground objects based on map information.

8. The distance estimation device according to claim 1, wherein the two ground objects are stationary ground objects.

9. A distance estimation device comprising:
a memory configured to store one or more programs; and
a central processing unit (CPU) coupled to the memory and configured to execute the one or more programs to:
acquire (i) first distances from a movable body to at least three ground objects and (ii) first angles formed by a traveling direction of the movable body and directions of the at least three ground objects, respectively, based on a first output from an external field sensor, on the movable body, measuring the at least three ground objects at a first time;
acquire (iii) second distances from the movable body to the at least three ground objects and (iv) second angles formed by a traveling direction of the movable body and directions of the at least three ground objects, respectively, based on a second output from the external field sensor measuring the at least three ground objects a second time;
acquire distances between the at least three ground objects;
calculate a moving distance of the movable body from the first time to the second time based on the acquired first distances, first angles, second distances, second angles, and the acquired distance between the at least three ground objects; and
calibrate a movable body speed pulse signal by using the calculated moving distance.

10. The distance estimation device according to claim 9, wherein the at least three ground objects are stationary ground objects.

11. A distance estimation method executed by a distance estimation device comprising:
a first acquiring process configured to
acquire (i) first distances from a movable body to two ground objects and (ii) first angles formed by a traveling direction of the movable body and directions of the two ground objects, respectively, based on a first output from an external field sensor, on the movable body, measuring the two ground objects at a first time,
acquire (iii) second distances from the movable body to the two ground objects and (iv) second angles formed by a traveling direction of the movable body and directions of the two ground objects, respectively, based on a second output from the external field sensor measuring the two ground objects a second time;
a second acquiring process configured to acquire a distance between the two ground objects;
a calculating process configured to calculate a moving distance of the movable body from the first time to the second time based on results acquired by the first acquiring process and the second acquiring process; and
a calibration process configured to calibrate a movable body speed pulse signal by using the calculated moving distance.

12. A distance estimation method executed by a distance estimation device comprising:
a first acquiring process configured to
acquire (i) first distances from a movable body to at least three ground objects and (ii) first angles formed by a traveling direction of the movable body and directions of the at least three ground objects, respectively, based on a first output from an external field sensor, on the movable body, measuring the at least three ground objects at a first time,
acquire (iii) second distances from the movable body to the at least three ground objects and (iv) second angles formed by a traveling direction of the movable body and directions of the at least three ground objects, respectively, based on a second output from the external field sensor measuring the at least three ground objects a second time;
a second acquiring process configured to acquire distances between the at least three ground objects, respectively;
a calculating process configured to calculate a moving distance of the movable body from the first time to the second time based on results acquired by the first acquiring process and the second acquiring process; and
a calibration process configured to calibrate a movable body speed pulse signal by using the calculated moving distance.

13. A non-transitory computer-readable medium storing a program executed by a distance estimation device comprising a computer, the program causing the computer to:

acquire (i) first distances from a movable body to two ground objects and (ii) first angles formed by a traveling direction of the movable body and directions of the two ground objects, respectively, based on a first output from an external field sensor, on the movable body, measuring the two ground objects at a first time acquire (iii) second distances from the movable body to the two ground objects and (iv) second angles formed by a traveling direction of the movable body and directions of the two ground objects, respectively, based on a second output from the external field sensor measuring the two ground objects a second time;

acquire a distance between the two ground objects;

calculate a moving distance of the movable body from the first time to the second time based on the acquired first distances, first angles, second distances, second angles, and the acquired distance between the two ground objects; and calibrate a movable body speed pulse signal by using the calculated moving distance.

14. A non-transitory computer-readable medium storing a program executed by a distance estimation device comprising a computer, the program causing the computer:

acquire (i) first distances from a movable body to at least three ground objects and (ii) first angles formed by a traveling direction of the movable body and directions of the at least three ground objects, respectively, based on a first output from an external field sensor, on the movable body, measuring the at least three ground objects at a first time acquire (iii) second distances from the movable body to the at least three ground objects and (iv) second angles formed by a traveling direction of the movable body and directions of the at least three ground objects, respectively, based on a second output from the external field sensor measuring the at least three ground objects a second time;

acquire distances between the at least three ground objects, respectively;

calculate a moving distance of the movable body from the first time to the second time based on the acquired first distances, first angles, second distances, second angles, and the acquired distance between the at least three ground objects; and calibrate a movable body speed pulse signal by using the calculated moving distance.

\* \* \* \* \*